April 18, 1961   P. C. HUNGERFORD, JR   2,979,925
FLEXIBLE SHAFT COUPLINGS
Filed April 30, 1959

INVENTOR.
P. C. HUNGERFORD JR.
BY George M. Soule
ATTORNEY

United States Patent Office 2,979,925
Patented Apr. 18, 1961

2,979,925
FLEXIBLE SHAFT COUPLINGS

Philip C. Hungerford, Jr., Cleveland Heights, Ohio, assignor to Curtiss-Wright Corporation, a corporation of Delaware Filed Apr. 30, 1959, Ser. No. 810,123

4 Claims. (Cl. 64—15)

This invention relates to flexible or universal type couplings for shafts or generally aligned rotary elements, wherein one of the shafts or members to be coupled is adapted to be supported by the other in centered relationship therewith at the axial center of the coupling while permitting one of the two shafts or members to move out of alignment with the other remotely of such center to a limited extent during operation to transmit torque.

Shaft couplings of the "universal" type utilizing helical spring encircling relatively adjacent external "drum" portion of the shafts or coacting with internal drum members attached to such shafts are well known. In all instances, so far as I know, the helical springs are employed principally for the purpose of enabling torsional yield of limited extent or in other words some relative angular movement of the shafts about their axes in the normal direction of operation to transmit torque. Such prior universal type couplings employing helical springs are incapable of accurately centering one shaft in reference to the cooperating shaft (piloting action), or, in other words, are incapable of serving as a satisfactory radial support at all times for such cooperating shaft. Usually the helical spring or springs involved in such known couplings are normally spaced radially from the shaft end portions or equivalent drum members rigid with the shafts to be couple, and the angular yielding referred to is limited by contraction or expansion of the springs against the adjacent surfaces of the shafts or drum members carried thereby so that the couplings so formed are not positive or torsionally stiff. Plural springs (interwound or intertwined) are also known in the art relating to universal type couplings, but so far as I know none of the prior arrangements utilizing such interwound springs constitute an accurate means for holding the adjacent ends of the shafts in centered relationship while enabling movement of portions of the shafts remotely of the couplings out of alignment or as accomplished by more or less complex, transversely bulky and relatively expensive universal joints or shaft-coupling mechanism.

The present coupling unit or mechanism which may consist solely of three interwound helical springs of uniform diameter in interference or preloaded relationship to the shaft ends (or drums thereon) provides a torsionally stiff and radially approximately stiff universal type coupling enabling the shaft axes to be angularly movable out of alignment while being maintained solidly and accurately centered or with their axes intersecting at the axial center of the coupling. Thus the present coupling while being of relatively simple construction and radially extremely compact as compared to most universal type couplings, operates essentially as does a so-called "Thomas type" coupling having a flexible metal disc and two pairs of coupling pins parallel to respective shaft axes and attached solidly to the respective shafts to be connected and arranged snugly to enter mating holes in the disc, the two pairs of holes and pins being at right angles to each other about axes of the shafts.

Additionally the present coupling allows strongly and uniformly resisted or controlled angular movement of the shafts about their axes in one direction only (torque limiting action) while operating as a torsionally rigid or positive torque coupling in the opposite direction.

Because the present coupling operates as a very satisfactory pilot bearing or journal for one of each of two relatively adjacent shafts connected thereby, the problem of obtaining satisfactorily operating alignment of three or more bearings, as in installations requiring two or more long shaft sections with non-binding but laterally fixed rigid supports, is greatly simplified.

Objects and features of the present invention not referred to or indicated above will be made apparent in the following description in reference to the accompanying drawing showing presently preferred forms. The essential characteristics are summarized in the claims.

Figure 1:
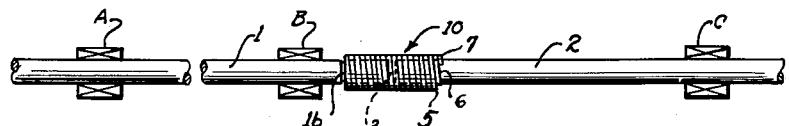
Fig. 1 is a diagrammatic assembly view showing two shafts connected by the present coupling unit or assembly in one form.

Referring to Fig. 1, shafts 1 and 2 are normally aligned at their adjacent ends within the present helical spring coupling unit assembly 10. One of the shafts has a conventional arrangement of bearings A and B so that the end portion of the shaft 1 which projects within the coupling assembly 10 has its principal support as a cantilever from bearing B. Shaft 2 requires a bearing C remotely of the coupling assembly 10 but requires no bearing adjacent the coupling.

Figure 2:
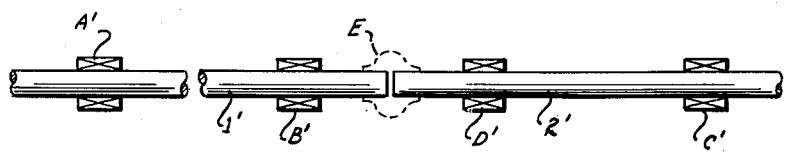
Fig. 2 is a similar diagram showing two shafts with a conventional universal type flexible coupling (shown in outline only) of such type as will not positively center the shafts or support one from the other at a point between the two shafts.

In Fig. 2 wherein the shafts 1' and 2' are connected by a conventional flexible or universal type coupling E which has no shaft aligning or piloting action or capability the bearings A', B' and C' must be augmented by an additional radial bearing D'. If a shaft such as 2 of Fig. 1 were to be disposed intermediately of two shafts (not shown) each having bearings such as A and B, then such (non-illustrated) shaft 2 would not require any bearing C, assuming a present coupling unit 10 were to be provided at each end of such intermediate shaft 2.

Figure 3:
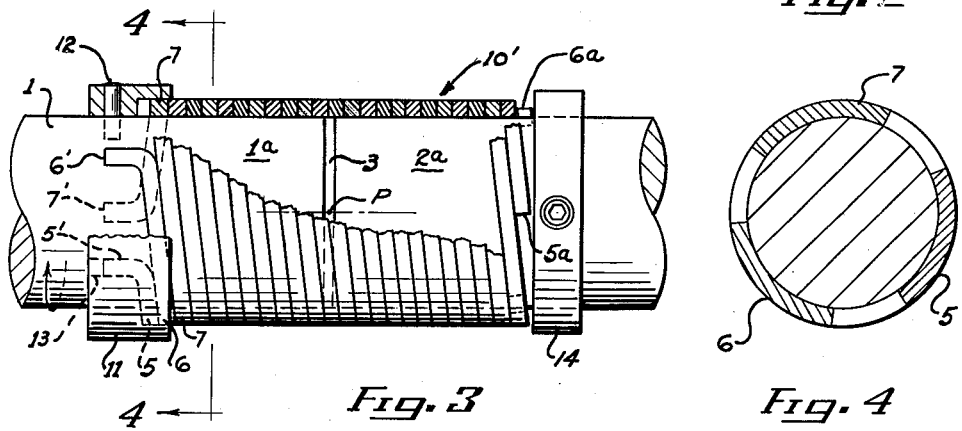
Fig. 3 is a relatively enlarged view of the present coupling partly in longitudinal cross section and portions of two shafts as connected by the coupling.

In Fig. 1 the three helical springs 5, 6 and 7 are adapted to be held in position against moving along the shafts 1 and 2 in either longitudinal direction by means of short radial toe portions (not shown) of the springs located at the left end of the spring assembly 10 and loosely occupying a shallow peripheral groove 1a in shaft 1. The spring toes are sprung into place in the groove. In Fig. 3 the helical spring assembly 10' is positioned axially by collars 11 and 14 suitably secured to the respective shafts 1 and 2 as by pins 12 or other suitable fastening means.

Referring further to Fig. 3 the shafts 1 and 2 as aligned by the individual spring elements or members 5, 6 and 7 of coupling assembly 10' are spaced apart as at 3 (crossover region) a suitable distance depending upon the amount of transverse misalignment that can be expected in service incident to requirement of lateral movement of one end of the shaft 2 opposite its illustrated end (e.g. as would be the case in a propeller shaft of an automotive vehicle). The spacing at crossover 3, as will be more fully explained below, is not particularly critical as to dimensions, or in other words may vary over wide limits, thus, inter alia, facilitating assembly with whatever frame or cooperating mechanism components (not shown) are involved.

The adjacent ends of shafts 1 and 2 have suitable drum-constituting or approximately circular surfaces 1a and 2a enveloped by the individual spring members 5, 6 and 7 and extending to the crossover region 3. The three spring members 5, 6 and 7 are preferably made by open winding (e.g. with a triple thread effect as compared to screw threads) with approximately or nearly twice the distance between individual turns as the width or thickness of the coiled spring stock measured axially of the coupling assembly 10'. Then the three springs are screwed together or interwound for example as shown by patent of W. C. Starkey, 1,966,267, dated July 10, 1935, relating to a spring clutch (not a flexible or universal type coupling).

The three springs 5, 6 and 7 may be held circumferentially in position at one end of the coupling or coupling assembly 10', so as to prevent relative angular movement of the springs about their longitudinal axis, as by above mentioned collar 11. One way of holding the ends of the spring members in 120° angularly spaced apart relationship or as shown in Fig. 3 is to provide axial sockets or holes 13 adapted to receive parallel toe or bent out lug portions 5', 6' and 7' of the individual spring members. If desired the end portions of the springs associated with the collar 11 may be tightly joined to the collar 11 as by welding, brazing or pinning (not illustrated). In that case, since in operation the spring assembly 10' could not crawl out of position along the shaft as in a direction from shaft 1 towards shaft 2, abutment or positioning means 14 for the opposite ends 5a, 6a, etc. of the springs would be unnecessary. If the individual spring members are not fastened together (e.g. as assumed and partially shown in Fig. 1) and are not restrained from circumferential movement relative to shafts 1 and 2 (as in Fig. 1) then coils at both ends of the spring assembly can (to advantage as already indicated) overrun on the associated shaft portions. When lugs 5', 6' etc. are provided as shown in Fig. 3 then, during overrun, the lugs are subjected to at least some strain and flexure, particularly if the spring coils are heavily preloaded on the shafts.

Figure 4:
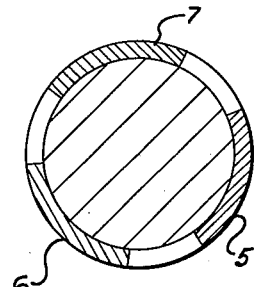
Fig. 4 is a transverse sectional view taken as at line 4—4 on Fig. 3.

It is important that at the crossover gap on region 3 and for some distance along each shaft therefrom the spring coils shall be permanently in interference fitting or preloaded relationship to the shaft or drum surfaces 1a and 2a. Usually in practice all the coils are uniformly preloaded against those surfaces. Referring to Fig. 4 it will be noted that the plane of the section cuts the three spring members 5, 6 and 7 at regions exactly 120° apart from each other. Such 120° relationship occurs at all points intermediately of the end portions of the spring assembly, hence the three spring members in the region of the crossover 3 have the capability of strongly holding the adjacent ends of the shafts exactly concentric with each other at point P, Fig. 3, which is coincident with the common axis of the shaft end portions when and if the shafts are aligned. Notably, as exhibited by Fig. 3, the individual spring coils bridge the crossover gap 3 at roughly three times the angle at which a single or normally close-coiled clutch spring formed of a single helical member would bridge the crossover gap. This has the advantage of enabling use of a crossover gap 3 wider if desired or found expedient for assembly purposes as previously mentioned, than the width of the spring coil stock axially of the shaft without danger of the coils entering the gap or effective groove provided at the crossover. Thus the present coupling in all forms disclosed hereby can enable considerable angular displacement of one shaft with reference to the other about the axial center of the coupling.

In operation it will be apparent that the springs 5, 6 and 7 are self energizing at their free ends (e.g. end portions 5a, 6a, etc.) hence grip the shaft drum portions 1a and 2a with exponential force increase as well known in spring clutch practice toward the crossover region 3. The coil assembly or coupling 10' is absolutely stiff torsionally in the direction of operation indicated by the arrow at the left in Fig. 3. Since the free end portions 5a, 6a and 7a are not attached to the shaft 2 and can have any desired preloading against drum surface 2a within the limits of elasticity of the spring stock, considerable torque can be transmitted in the reverse direction or opposite of the arrow in Fig. 3 before overrun of the coils on drum surface 2a occurs. The torque capacity of the present flexible coupling unit in the normal direction of operation is determined, as in spring clutches, by the material and cross section of the spring stock and the number of coils of each individual spring member 5, 6, 7 (or more) which operate in parallel with each other. Similarly in operation in the torque limiting direction (opposite of arrow) the torque capacity of the coupling unit is the sum of the overrunning torque values for which the individual spring members are designed, and the friction drag (during overrun) is essentially constant under all conditions despite variations in coefficient of friction, which may vary widely.

Figure 5:
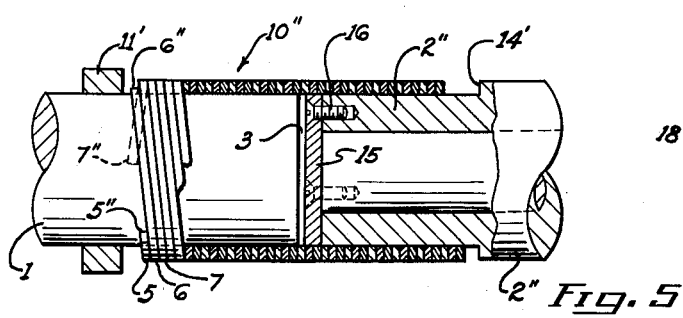
Fig. 5 is a partly elevational and partly cross sectional view showing a modified form of the present coupling and a portion of a hollow shaft especially adapted to be made of light weight metal.

Fig. 5 shows uniformly circumferentially spaced free terminal portions 5", 6" and 7" of the three spring coil members 5, 6 and 7 in position for abutment with collar 11' or an axial shoulder (not shown) formed on the shaft 1. At the opposite end of the spring assembly 10" the axial positioning means 14' is shown as an axial shoulder formed on the shaft 2", and the associated spring coils are preloaded on the thereby reduced diameter end portion of the shaft. Shaft 2", as shown, is hollow and if, additionally to minimize its mass, the shaft is made of a light weight metal such as aluminum then the end of such shaft which terminates within the coil spring assembly 10" may be reinforced as necessary adjacent the crossover region 3 where the maximum gripping forces of the coils or the coupling occur. The reinforce may be in the form of a hard metal plug (e.g. tightly fitting into the hollow end of the shaft) or may comprise a cap such as illustrated at 15 secured as by screws 16. In event of using such relatively soft material for one or both of the shafts, then each shaft so composed would have such reinforce means 15 or the like as described above. In an arrangement such as Fig. 5 (or Fig. 1) the coil members 5, 6 and 7 are operatingly secured to both the shafts 1 and 2" solely by interference fitting between the coil members and associated shaft surfaces.

Figure 6:
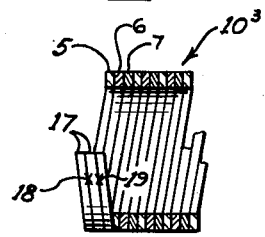
Fig. 6 is a fragmentary view of a modified helical spring assembly for use in the present coupling.

Fig. 6 shows the three coil members 5, 6 and 7 with co-planar terminal portions at one end of the coil assembly 10³, providing a circumferential flat shoulder or abutment 17. In this case a ring or collar similar to part 11, Fig. 3, could be used if desired (not illustrated) having a helix formation of known form for receiving the end portions of the three springs or, alternatively, the ring or collar such as 11' in Fig. 5 could merely abut the axially outermost end portion of the coil member 5 as a travel-limiting stop. The three end portions of the coil assembly 10³ of Fig. 6 (or in any case for that matter) can be brazed together or otherwise fixed to each other against relative angular movement about the common longitudinal axis of the springs as at regions indicated 18 and 19 in Fig. 6.

Obviously the drum surface portions 1a and 2a of shafts 1 and 2 could be internal instead of external or the drum surface on one shaft could be internal and the operationally corresponding drum surface on the other shaft could be external.

Figure 7:
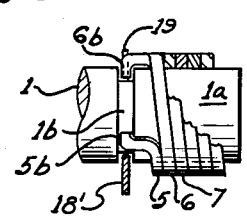
Fig. 7 is a fragmentary view generally similar to Figs. 3 and 5 showing a portion of a shaft and a portion of a modified spring assembly.

Fig. 7 is a fragmentary view generally similar to Figs. 3 and 5, further showing the coupling construction according to Fig. 1 but with the addition of a positioning member 18' similar to a snap ring loosely seated in the groove 1b of shaft 1 in the transverse plane of the inwardly bent toe portions 5b, 6b and 7b of the three helical spring members to hold the toe portions just mentioned in 120° spaced relationship around the groove in the shaft. The two free ends of the positioning member provide shoulders (one indicated 19 in Fig. 7) to locate or position one toe portion (e.g. 6b) and has inwardly facing notches (not shown) formed therein to embrace the other two toe portions 5b and 7b.

I claim:

1. In combination with two rotary shafts axially spaced apart at their adjacent end portions, a flexible coupling for said adjacent end portions and comprising a coil assembly having at least three interwound helical spring members preloaded in interference fitting relationship to circular peripheral surfaces of both shaft end portions, the individual spring members being attached to each other so as to prevent relative angular movement about the longitudinal axis of the spring members.

2. The combination according to claim 1, wherein one of the shafts is generally composed of light weight metal such as aluminum and its end portion within the spring assembly is peripherally reinforced adjacent the axial space or cross over region between the two shafts.

3. A universal joint coupling enabling angular flexibility between rotatable shafts having axially spaced apart drum surface portions of circular cross section and of approximately equal diameters, a coil assembly comprising at least three interwound elastic metal helical coil members bridging and preloaded against the drum surface portions of both shafts and operating strongly to hold their adjacent end portions substantially in alignment while inflexibly transmitting high torque from one to the other in one direction, the preloaded coil members being secured to one of the shafts solely by such preloading whereby to enable overrun on the drum surface of one shaft in the opposite direction, while effecting transmission of substantial torque to or through that shaft in said opposite direction and means positively securing the coil members to each other against angular relative movement of the members about the axes of the shafts.

4. In combination with two rotary shafts axially spaced apart at their adjacent end portions, a flexible coupling for said adjacent end portions and comprising a coil assembly having at least three interwound helical spring members preloaded in interference fitting relationship to circular peripheral surfaces of both shaft end portions, the spring assembly being held in position axially by radially extending toe portions of each of the individual spring members projecting into a peripheral groove in one of the shafts, and a member occupying the groove, turnable therein, and having circumferentially spaced shoulders engaging end portions of the springs to prevent the springs from moving out of angular relationship to each other.

References Cited in the file of this patent

UNITED STATES PATENTS

| | | |
|---|---|---|
| 677,872 | Locke | July 9, 1901 |
| 1,485,036 | Kingsley | Feb. 23, 1924 |
| 1,507,920 | Karge et al. | Sept. 9, 1924 |
| 1,950,448 | Heisterkamp | Mar. 13, 1934 |
| 1,966,267 | Starkey | July 10, 1934 |
| 2,242,379 | Wahl | May 20, 1941 |
| 2,723,013 | Rogers et al. | Nov. 8, 1955 |

FOREIGN PATENTS

| | | |
|---|---|---|
| 329,404 | Great Britain | May 25, 1929 |